(12) United States Patent
Stattenfield

(10) Patent No.: US 6,976,249 B1
(45) Date of Patent: Dec. 13, 2005

(54) METHOD FOR EMBEDDING OBJECT CODES IN SOURCE CODES

(75) Inventor: Keith Stattenfield, Santa Clara, CA (US)

(73) Assignee: Apple Computer, Inc., Cupertino, CA (US)

( * ) Notice: Subject to any disclaimer, the term of this patent is extended or adjusted under 35 U.S.C. 154(b) by 695 days.

(21) Appl. No.: 10/011,342

(22) Filed: Nov. 12, 2001

(51) Int. Cl.$^7$ .................................................. G06F 9/45

(52) U.S. Cl. ....................... 717/149; 717/145; 717/146; 712/203

(58) Field of Search ................. 717/110–112, 136–149; 712/200–203

(56) References Cited

U.S. PATENT DOCUMENTS

| | | | |
|---|---|---|---|
| 5,724,590 A * | 3/1998 | Goettelmann et al. ...... | 717/154 |
| 5,946,484 A * | 8/1999 | Brandes ...................... | 717/136 |
| 6,279,150 B1 * | 8/2001 | Bachmann ................... | 717/136 |
| 6,487,713 B1 * | 11/2002 | Cohen et al. ................ | 717/105 |
| 6,763,516 B2 * | 7/2004 | Fujikawa .................... | 717/112 |

OTHER PUBLICATIONS

Apple Corp., "MPW Command Reference," Jul. 2000, http://developer.apple.com/tools/mpw-tools/commandref/streamedit.html.*

* cited by examiner

Primary Examiner—Kakali Chaki
Assistant Examiner—Lawrence Shrader
(74) Attorney, Agent, or Firm—Blakely, Sokoloff, Taylor & Zafman LLP

(57) ABSTRACT

Methods for embedding codes executable in a first system having a first microprocessor into codes executable in a second system having a second microprocessor are described herein. In one aspect of the invention, an exemplary method includes providing first codes having a routine, the first codes being compilable to be executed in the first system, and compiling the first codes, resulting in second codes; the second codes comprising opcodes of the routine executable by the first system, which convert the second codes into third codes automatically, the third codes being compilable to be executed by the second system; this is followed by compiling the third codes, resulting in the fourth codes being executable in the second system, and linking the fourth codes, generating an executable image and executing the executable image in the second system. Other methods and apparatuses are also described.

35 Claims, 14 Drawing Sheets

```
DisableInterrupts              PROC moveq       #0, d0          ; clear upper half of d0
        move        sr, d0          ; get the current status register
        ori.w       #$0700, sr      ; slam 7 into the interrupt level
        lsr.w       #8, d0          ; shift the interrupt part down
        andi.w      #7, sr          ; and off the non-interrupt parts
        rts                         ; and return to the caller endproc EnableInterrupts               PROC andi.w      #7, d0          ; mask off any bits not used
        lsl.w       #8, d0          ; shift the level up
        move        sr, d1          ; get the current sr
        andi.w      #$f8ff, d1      ; clear out the interrupt level
        or.w        d0, d1          ; then put in the new level
        move        d1, sr          ; then put it into the status register
        rts                         ; return back to the caller endproc
```

Figure 9A

```
UInt32 DisableInterrupts ( )
{
    return ( (GETSTATUSREGISTER() >> 8 ) & 0x07 );
}

UInt32 EnableInterrupts ( unsigned short intlevel )
{
    intlevel = intlevel & 0x07;
    SETSTATUSREGISTER( GETSTATUSREGISTER() | intlevel );
}
```

Figure 9B

| | | | | | |
|---|---|---|---|---|---|
| 00000 | DisableInterrupts | | PROC | | |
| 00000 | | | | | |
| 00000 | 7000 | moveq | #0, d0 | ; clear upper half of d0 | |
| 00002 | P 40C0 | move | sr, d0 | ; get the current status register | |
| 00004 | P 007C 0700 | ori.w | #$0700, sr | ; slam 7 into the interrupt level | |
| 00008 | E048 | lsr.w | #8, d0 | ; shift the interrupt part down | |
| 0000A | P 027C 0007 | andi.w | #7, sr | ; and off the non-interrupt parts | |
| 0000E | 4E75 | rts | | ; and return to the caller | |
| 00010 | | | | | |
| 00010 | | | endproc | | |

| | | | | | |
|---|---|---|---|---|---|
| 00000 | EnableInterrupts | | PROC | | |
| 00000 | | | | | |
| 00000 | 0240 0007 | andi.w | #7, d0 | ; mask off any bits not used | |
| 00004 | E148 | lsl.w | #8, d0 | ; shift the level up | |
| 00006 | P 40C1 | move | sr, d1 | ; get the current sr | |
| 00008 | 0241 F8FF | andi.w | #$f8ff, d1 | ; clear out the interrupt level | |
| 0000C | 8240 | or.w | d0, d1 | ; then put in the new level | |
| 0000E | P 46C1 | move | d1, sr | ; then put it into the status register | |
| 00010 | 4E75 | rts | | ; return back to the caller | |
| 00012 | | | | | |
| 00012 | | | endproc | | |

Figure 9C

```
short DisableInterrupts [ ] = {
    0x7000,              // 0000: moveq  #0, d0         ; clear upper half of d0
    0x40C0,              // 0002: move   sr, d0         ; get the current status register
    0x007C, 0x0700,      // 0004: ori.w  #$0700, sr     ; slam 7 into the interrupt level
    0xE048,              // 0008: lsr.w  #8, d0         ; shift the interrupt part down
    0x027C, 0x0007,      // 000A: andi.w #7, sr         ; and off the non-interrupt parts
    0x4E75,              // 000E: rts                   ; and return to the caller
};

short EnableInterrupts [ ] = {
    0x0240, 0x0007,      // 0000: andi.w #7, d0         ; mask off any bits not used
    0xE148,              // 0004: lsl.w  #8, d0         ; shift the level up
    0x40C1,              // 0006: move   sr, d1        ; get the current sr
    0x0241, 0xF8FF,      // 0008: andi.w #$f8ff, d1    ; clear out the interrupt level
    0x8240,              // 000C: or.w   d0, d1         ; then put in the new level
    0x46C1,              // 000E: move   d1, sr        ; then put it into the status register
    0x4E75,              // 000E: rts                   ; return back to the caller
};
```

Figure 9D

```
main      f       main.o
          PPCLink –o main main.o \
                  "{ SharedLibraries } InterfaceLib" \
                  "{ SharedLibraries } StdCLib" \
                  "{ SharedLibraries } MathLib" \
                  "{ PPCLibraries } PPCCRuntime.o" \
                  "{ PPCLibraries } StdCRuntime.o" \ main.o    f       main.c Example68kCode.a.c    Makefile
          MrC main.c –o main.o Example68kCode.a.o   f       "Example68kCode.a"    Makefile
          Asm –s –o "Example68kCode.a.o" "Example68kCode.a" \
                  -l –h –lo "Example68kCode.a.lst"

Example68kCode.a.c  f Example68kCode.a.o  Convert68kAsmToCStructs.se  Makefile
          StreamEdit –d –s Convert68kAsmToCStructs.se –o \
                  "Example68kCode.a.c" "Example68kCode.a.lst"
```

Figure 9E

```
Print "/* This file was generated automatically; do not attempt to edit it. */"
Print "/* This file was generated automatically; do not attempt to edit it. */"
/0000([ ∂t]+)([¬ ∂t;]+)®1[ ∂t]+PROC∂n/  Print "short "®1"[] = {"
/([0-9A-F] [0-9A-F] [0-9A-F] [0-9A-F])®1??(([0-9A-F] [0-9A-F] [0-9A-F] [0-9A-F])®2)
   [ ∂t]+(≈)®5/  Print "    0x"®2",           // "®1": "®5
/([0-9A-F] [0-9A-F] [0-9A-F] [0-9A-F])®1???(([0-9A-F] [0-9A-F] [0-9A-F] [0-9A-F])®2
   ([0-9A-F] [0-9A-F] [0-9A-F] [0-9A-F])®3)    [ ∂t]+(≈)®5/
   Print " 0x"®2", 0x"®3",            // "®1": "®5
/([0-9A-F] [0-9A-F] [0-9A-F] [0-9A-F])®1???(([0-9A-F] [0-9A-F] [0-9A-F] [0-9A-F])®2
   ([0-9A-F] [0-9A-F] [0-9A-F] [0-9A-F])®3 ([0-9A-F] [0-9A-F] [0-9A-F] [0-9A-F])®4)
   [ ∂t]+(≈)®5/ Print "    0x"®2", 0x"®3", 0x"®4",   // "®1": "®5
/≈;≈C_CODE:(≈)®1/            Print " "®1                Print " };∂n"
/([0-9A-F] [0-9A-F] [0-9A-F] [0-9A-F])[ ∂t]+endproc/ [ ∂t]+endproc/
```

Figure 9F

```
#include <MixedMode.h>

// Include the automatically generated 68k code structures
#include "Example68kCode.a.c"

enum {
DisableInterruptsProcInfo =
        kRegisterBased | RESULT_SIZE( SIZE_CODE( sizeof( short ))) |
            REGISTER_RESULT_LOCATION( kRegisterD0 ),
EnableInterruptsProcInfo =
        KRegisterBased | REGISTER_ROUTINE_PARAMETER( 1, kRegisterD0,
            SIZE_CODE( sizeof( short )))
};

void main ()
{
        unsigned short intLevel;

// Call the 68k code by going through the Mixed Mode Manager
        intLevel = CallUniversalProc( (UniversalProcPtr) & DisableInterrupts,
                                        DisableInterruptsProcInfo );

// Do whatever it needs to do with 68k interrupts disabled...

// Re-enable 68k interrupts
        CallUniversalProc ( (UniversalProcPtr) & EnableInterrupts,
                                        EnableInterruptsProcInfo, intLevel );

METHOD FOR EMBEDDING OBJECT CODES IN SOURCE CODES

FIELD OF THE INVENTION

The present invention relates generally to computer systems, and more specifically to a method of embedding an object code executable in one architecture into a source code compilable to be executed in another architecture.

BACKGROUND OF THE INVENTION

When a new computer processor is developed, existing applications or programs, herein "applications," which executed properly on a prior computer processor may not execute properly on the new computer processor. These old, or in other words non-native applications, are typically "ported," i.e., rewritten or translated, to run on the new processor. Usually, until an application is ported, it is unable to take advantage of any beneficial features in the new processor. Depending on the amount of effort required to port the application, there may be a substantial amount of time lost before an application can benefit from the new processor.

Typically a computer system having the new computer processor will have a separate environment for running "old" applications written for the old processor. This environment is called a "compatibility box." In these systems there is substantially no interaction between the compatibility box and the new processor environment, otherwise known as the "native" environment. Thus "old" applications cannot take advantage of performance benefits and other advantageous features available in the native environment. It is often difficult to execute arbitrary "old" code from the native environment as well.

Some computer systems have emulators, which permit the computer system to execute code which is written for a processor other than the processor which is native to the computer system. Typically, these emulators assume a single runtime environment, that is to say they assume that the conventions for invoking program procedures and performing stack manipulations are common to both the native and non-native or emulated code. These emulators typically just alter the instructions set and are not structured to handle two different types of program object code which have different routine calling and stack manipulation conventions.

However, the process to embed the object codes in a new source code is quite labor-intensive. For instance, the assembly instructions executable by Motorola's 680×0 microprocessor in a Macintosh computer cannot be executed directly by a PowerPC processor of a PowerPC computer. FIG. 9A shows an example of assembly instructions written in Motorola's 680×0 assembly language. In order for the codes being able to execute in PowerPC computer, the assembly instructions may required to be translated into PowerPC instructions or into a language which can be compiled into PowerPC instructions (e.g., C language such as one shown in FIG. 9B). In some cases, it is impractical to rewrite the routine in C; for example, function SETSTATUSREGISTER may not possibly be implemented, because there is no direct analogy in the PowerPC instruction set as to what is being done. Therefore, it is necessary to embed the object code of the routine in the source code of the PowerPC computer, in order to allow the emulator to perform the execution.

One method to embed an object code, such as the object code of the routine of FIG. 9A, in a source code of PowerPC is to compile the routine with a 680×0 compatible assembler, create corresponding code resources for the routine in a resource file and calculate an offset of the routine, and then place this code in a resource where it can be loaded later. At runtime, the resource would be loaded in memory, the entry point of the routine would be calculated, and the routine would be called by telling the emulator to begin execution of this calculated code address.

FIG. 1 shows a conventional method of embedding a Motorola 680×0 (68k) assembly object code in the source code. When the 68k assembly codes are received 101, the 68k codes are assembled with a Motorola 68k assembler. An object file (*.o) is created 102. Next the code resources are generated 103 based on the object file, and the code resources are manually converted into a format compatible with the new system. At runtime, the entry point of the routine is retrieved 104 from the code resources, and error checking is performed 105. Typically the entry point is retrieved through an application programming interface (API) GetResource( ). If there is no error, the routine is executed 106 through an API CallUniversalProc( ), otherwise an error message is generated 107 through an exception.

There are some disadvantages of this method. One of the disadvantages is that the resource may not be loaded successfully, due to numerous reasons (e.g., not enough memory, etc.); another disadvantage is that the entry point may not be valid (e.g., nil pointer). Thus there is no guarantee of having the routine available at runtime. In addition, this process involves intense manual calculations, which post inconvenience and poor efficiency to the software development. Therefore, a method to automatically embed an object code in a source code is highly desired.

SUMMARY OF THE INVENTION

Methods for embedding codes executable in a first system having a first microprocessor into codes executable in a second system having a second microprocessor are described herein. In one aspect of the invention, an exemplary method includes providing first codes having a routine, the first codes being compilable to be executed in the first system, and compiling the first codes, resulting in second codes; the second codes comprising opcodes of the routine executable by the first system, which convert the second codes into third codes automatically, the third codes being compilable to be executed by the second system; this is followed by compiling the third codes, resulting in the fourth codes being executable in the second system, and linking the fourth codes, generating an executable image and executing the executable image in the second system.

In one particular exemplary embodiment, the method includes opening an input file containing the second codes, detecting the routine, automatically converting the routine into a data structure compatible with the second system, and writing the data structure to an output file. Further, the method includes extracting the opcodes from the routine, defining the data structure using the name of the routine, the data structure being compilable to be executed by the second system and adding the opcodes into the data structure as constants.

The present invention includes apparatuses which perform these methods and machine-readable media which, when executed on a data processing system, cause the system to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 9A is an example of 68k assembly codes.

FIG. 9B is an example of equivalent "C" function corresponding to the 68k assembly codes shown in FIG. 9A.

FIG. 9C is an example of a textual output of the 68k assembler.

FIG. 9D shows an example of source codes converted by the present invention.

FIG. 9E is an example of a MAKE file used by one embodiment of the present invention.

FIG. 9F is an example of scripts used by the invention.

FIG. 9G is an example of a main routine calling the embedded object code.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Figure 1:
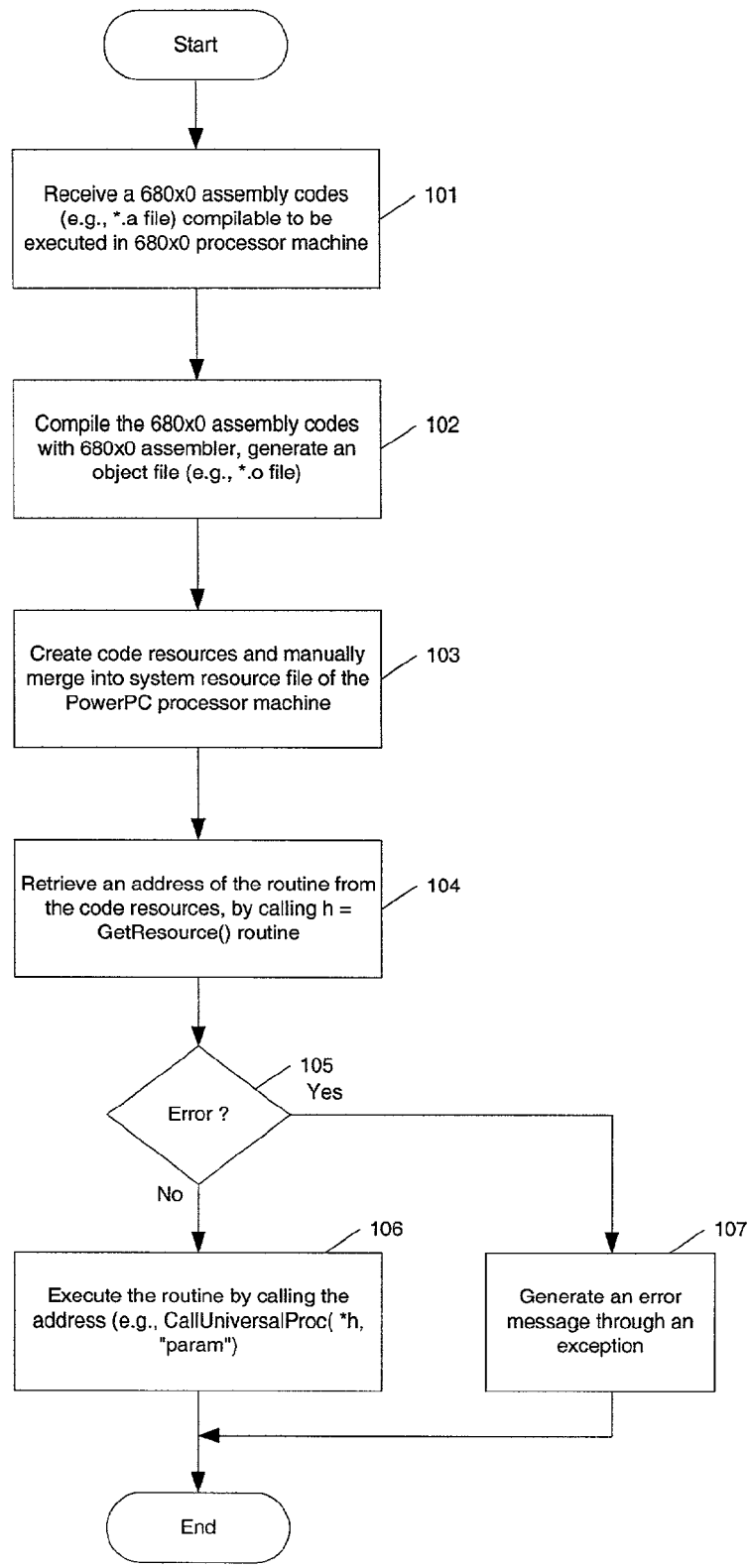
FIG. 1 shows a conventional method of embedding an object code into a source code.
Figure 2:
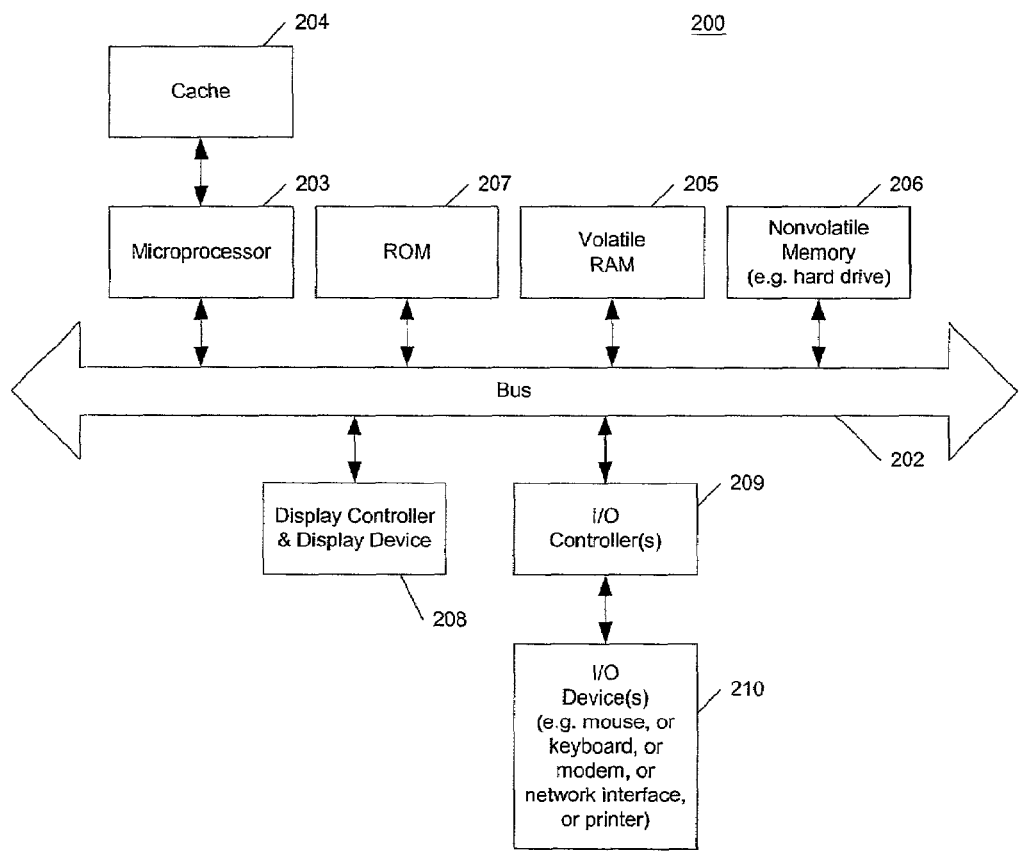
FIG. 2 shows an embodiment of a computer system that may be used with the present invention.

FIG. 2 shows one example of a typical computer system which may be used with the present invention. Note that while FIG. 2 illustrates various components of a computer system, it is not intended to represent any particular architecture or manner of interconnecting the components, as such details are not germane to the present invention. It will also be appreciated that network computers and other data processing systems which have fewer components or perhaps more components may also be used with the present invention. The computer system of FIG. 2 may, for example, be an Apple Macintosh computer.

As shown in FIG. 2, the computer system 200, which is a form of a data processing system, includes a bus 202 which is coupled to a microprocessor 203 and a ROM 207, a volatile RAM 205, and a non-volatile memory 206. The microprocessor 203, which may be a G3 or G4 microprocessor from Motorola, Inc. or IBM, is coupled to cache memory 204 as shown in the example of FIG. 2. The bus 202 interconnects these various components together and also interconnects these components 203, 207, 205, and 206 to a display controller and display device 208, as well as to peripheral devices such as input/output (I/O) devices, which may be mice, keyboards, modems, network interfaces, printers, and other devices which are well-known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

Figure 3:
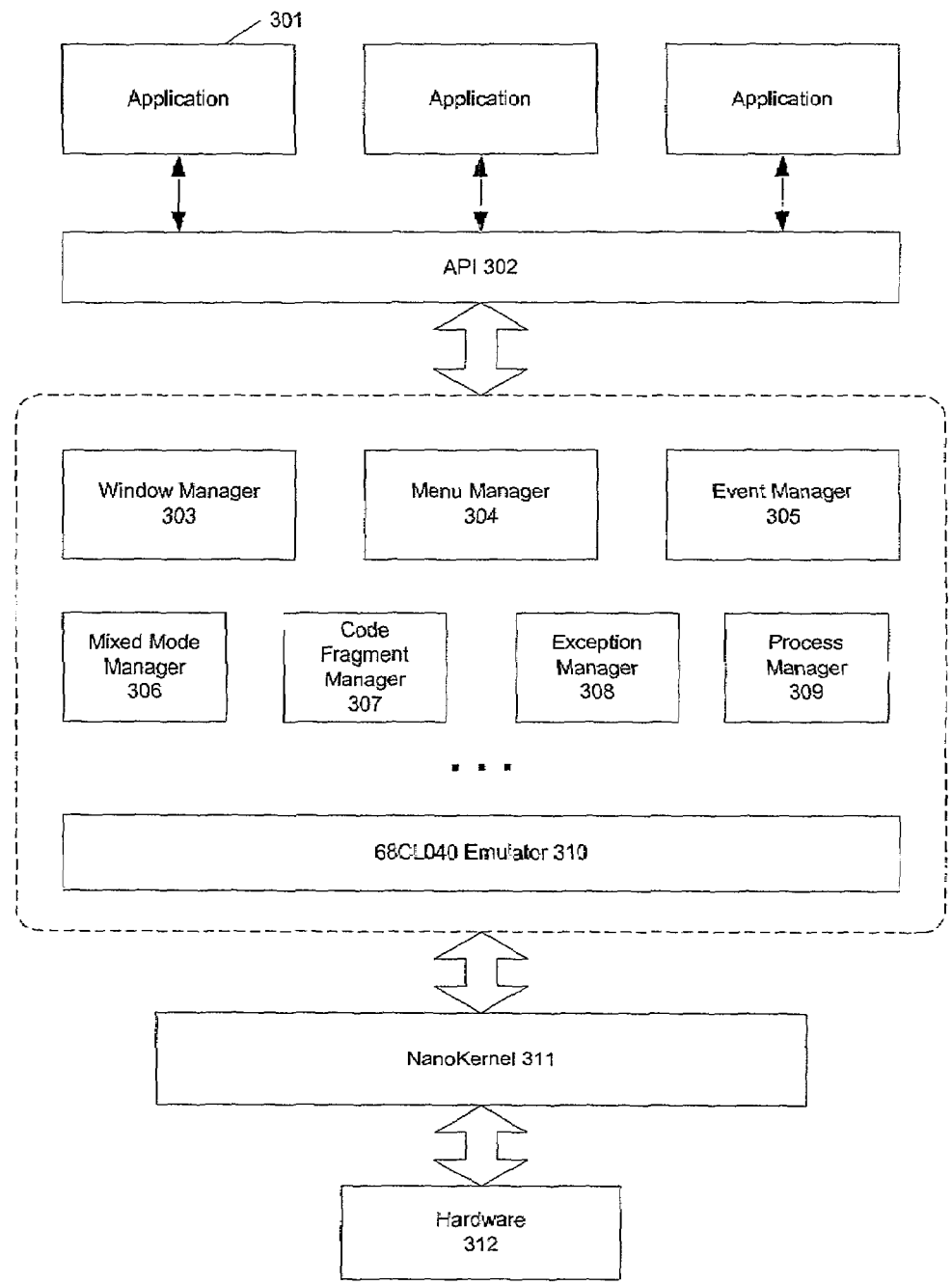
FIG. 3 shows another embodiment of a computer system which may be used with the present invention.

A computer such as computer system 200 of FIG. 2 normally comprises hardware and software executed by a processor such as microprocessor 203. FIG. 3 shows an architecture of a computer system. The software includes applications 301, operating system, and the hardware 312. The applications 301 communicate with the operating system through a set of application programming interfaces (APIs) 302. The operating system (OS) includes a plurality of managers, such as window manager 303, menu manager 304, event manager 305, mixed mode manager 306, code fragment manager 307, exception manager 308, process manager 309, and other managers. The OS also includes a 68LC040 emulator 310 and a nanokernel 311. The hardware 312 includes a PowerPC microprocessor.

The mixed mode manager 306 is the part of the Macintosh Operating System that allows PowerPC processor-based Macintosh computers to cooperatively run 68k applications, PowerPC applications, 68k system software, and PowerPC system software. It provides a number of capabilities, including transparent access to 68k-based system software from PowerPC applications, and transparent access to PowerPC processor-based system software from 68k applications. The mixed mode manager 306 provides methods which are independent of the instruction set architecture of calling an external piece of code. The methods include transparent access to PowerPC code by 68k applications, system support for calling 68k code from PowerPC code, and system support for calling PowerPC code from 68k code.

The mixed mode manager is intended to provide both PowerPC processor-based and 68k-based code transparent access to code written in another instruction set. It does this by keeping track of what kind of code is currently executing and, when necessary, switching modes. For example, if some PowerPC code calls a Macintosh operating system routine that exists only in 68k form, the mixed mode manager translates the routine's parameters from their PowerPC arrangement into the appropriate 68k arrangement. The mixed mode manager is an integral part of the system software for PowerPC processor-based Macintosh computers. It is designed to hide, as much as possible, the dual nature of the operating environment supported on PowerPC processor-based Macintosh computers running the 68k emulator (e.g., 68LC040 emulator).

Figure 4:
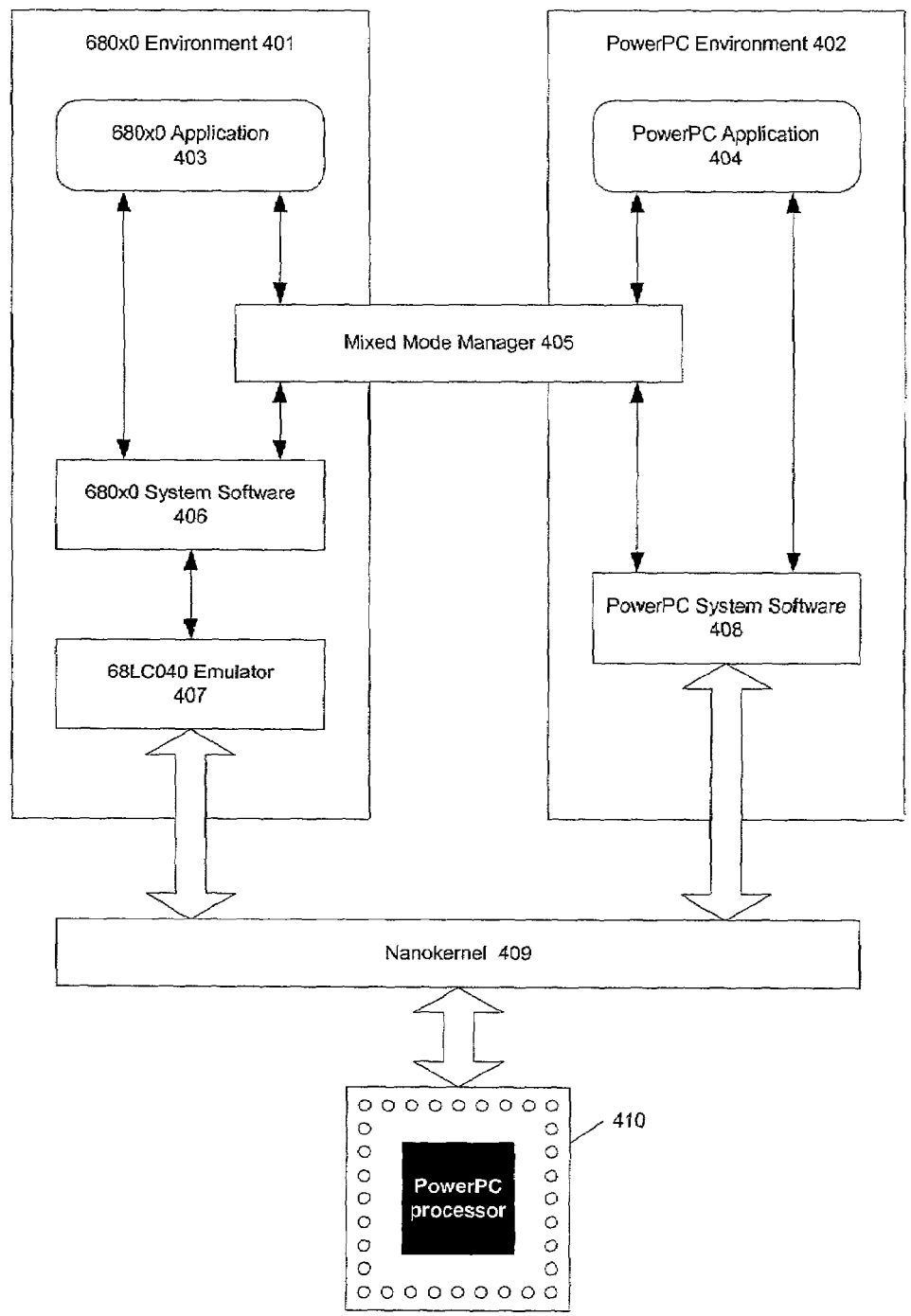
FIG. 4 shows an example of mixed mode operation used with an embodiment of the present invention.

FIG. 4 shows an example of a mixed mode manager operating with both PowerPC application and 68k application. Referring to FIG. 4, the PowerPC system incorporates both 68k environment 401 and PowerPC environment 402. The 68k-based application 403 communicates with 68k system software 406 directly. The instruction set of the 68k-based application 403 is translated by the 68k emulator 407 to an instruction set compatible with the PowerPC processor 410, and executed by the PowerPC processor 410 through a kernel 409. When the 68k-based application needs to communicate with PowerPC system software, the mixed mode manager 405 is invoked to provide transparent access to the PowerPC system software 408. Similarly, the PowerPC based application 404 communicates with PowerPC system software 408 directly. When the PowerPC application 404 needs to communicate with the 68k system software, the mixed mode manager 405 is invoked to provide transparent access to 68k system software 406.

Figure 6:
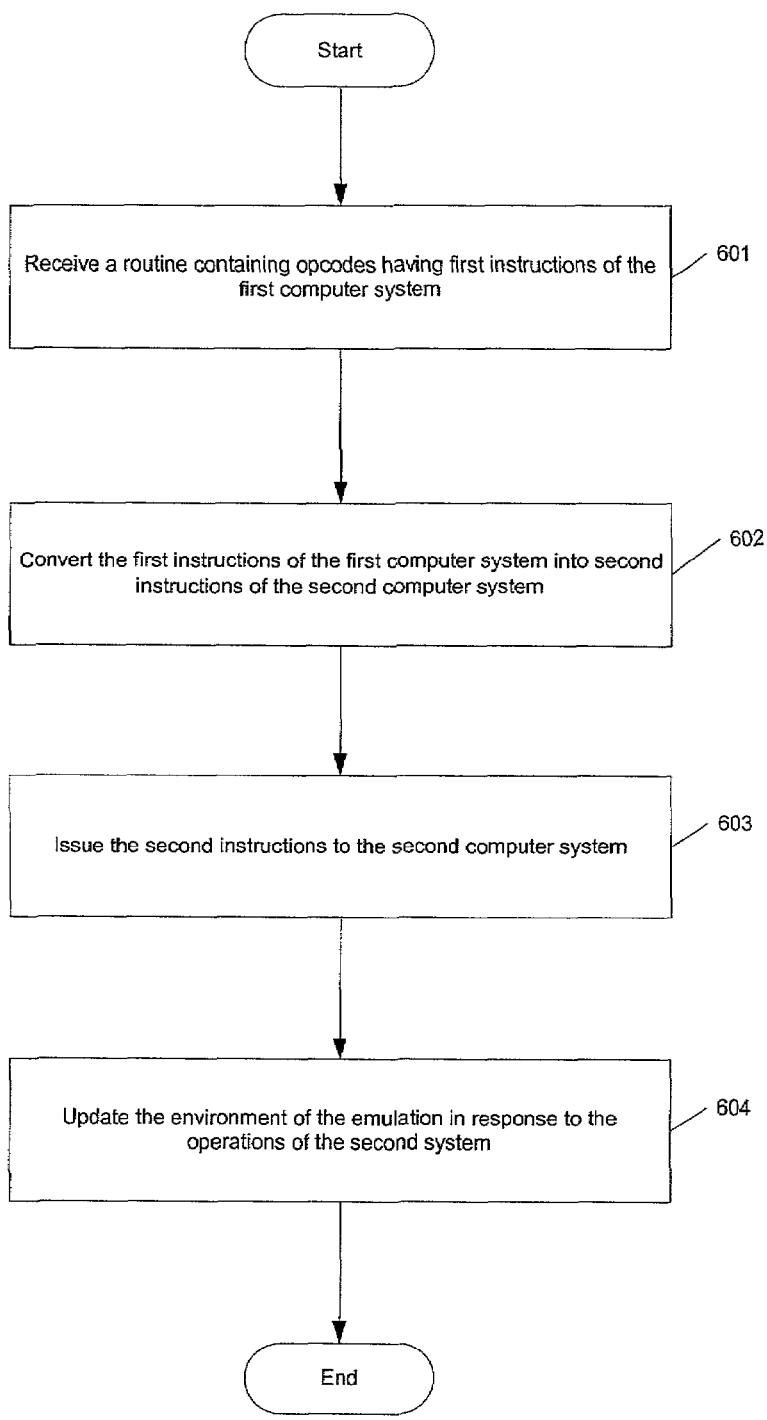
FIG. 6 shows an operation of an emulator used by a system shown in FIG. 4 or 5.

The 68k emulator 407 is the part of the PowerPC system software that allows 68k-based applications and other software to execute on PowerPC processor-based Macintosh computers. Emulator 407 provides an execution environment that is virtually identical to the execution environment found on 68k-based Macintosh computers. FIG. 6 shows an operation of the 68k emulator 407. Referring to FIGS. 4 and 6, when the emulator 407 receives 601 a 68k application, it converts 602 68k instructions into PowerPC instructions, issues 603 those instructions to the PowerPC microprocessor, and updates 604 the emulated environment in response to the operations of the PowerPC microprocessor 410.

Code fragment manager 307 is the part of the Macintosh system software that loads fragments into memory and prepares them for execution. A fragment can be an application, an import library, a system extension, or any other block of executable code and its associated data. The code fragment manager is the operating system loader for executable code and data that are contained in fragments. The code fragment manager provides loading and preparation of fragments for execution, automatic resolution of imported symbols by locating and loading import libraries used by a fragment, automatic execution of a fragment's initialization and termination routines, and support for updated version of import libraries.

Figure 5:
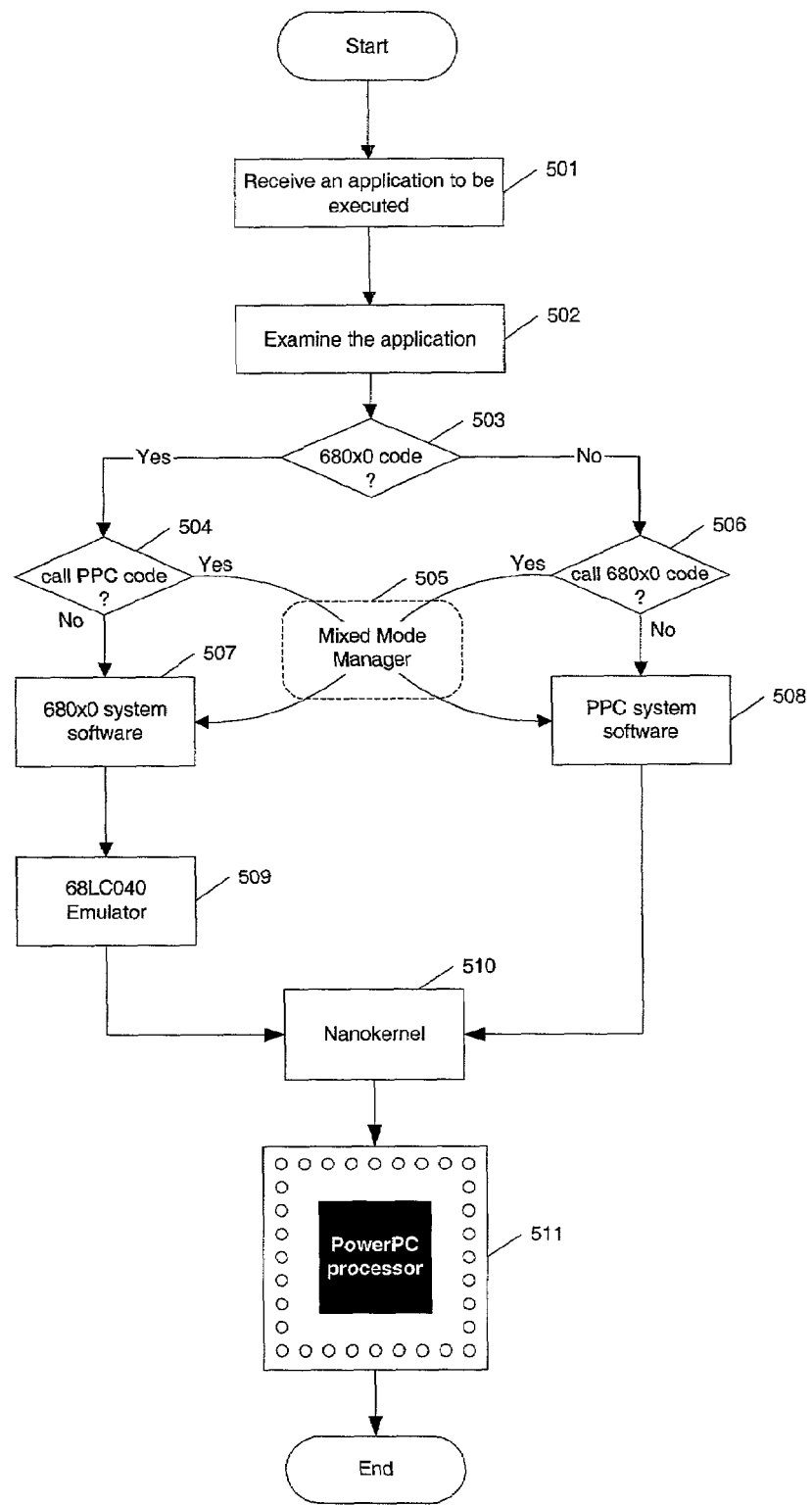
FIG. 5 shows another embodiment of the mixed mode operation used with the present invention.

Now referring to FIG. 5, when an application is loaded 501 to execute by the code fragment manager, the processor manager, such as processor manager 309 of FIG. 3, examines 502 the application. Typically, it examines the header of the application to determine 503 whether the application is a 68k-based application. If the application is a 68k application, it examines 504 whether the application needs communicate with PowerPC code (e.g., switch mode); if so, the mixed mode manager 505 is invoked to provide transparent access to the PowerPC system software 508, and thereafter the application is executed by the PowerPC microprocessor 511 through the nanokernel 510. If the 68k application does not need to communicate with PowerPC system software, it is executed through a 68k emulator 509 and thereafter to the PowerPC processor 511 through nanokernel 510.

The PowerPC application is also examined 506 to determine whether it needs to communicate with 68k system software; if so, the mixed mode manager 505 is invoked to switch from PowerPC environment to 68k environment, and provides transparent access to the 68k system software 507.

The 68k code is executed through the 68k emulator 509, and thereafter to the PowerPC processor 511 through nanokernel 510. If the PowerPC application does not need to call 68k system software, it communicates directly with PowerPC system software, and thereafter to the PowerPC processor 511 through nanokernel 510.

Further detail concerning mixed mode operation can be found in U.S. Pat. No. 5,452,456 entitled *Apparatus for Executing a Plurality of Program Segments Having Different Object Code Types in a Single Program or Processor Environment*, filed by Jean-Charles d. Mourey, et al., issued Sep. 19, 1995 and assigned to the same Assignee as the present invention. Such patent is hereby incorporated by reference.

As described above, much of the Macintosh OS consists of native PowerPC code, but some parts are still 68k code that executes inside the emulator which is part of the system software. It is occasionally necessary to execute small pieces of 68k code to perform some tasks, which cannot be done from PowerPC code. Typically in a conventional method, these pieces of code are constructed by hand once and stored in the system file in a resource, and therefore making any change to them is tedious, error-prone, and difficult.

The present invention introduces a method that uses a set of scripts which are run from a MAKE file, such as the MAKE file shown in FIG. 9E, which uses the existing tools to assemble, compile, and automatically insert these pieces of 68k code into the native code fragment. Several scripts, such as scripts shown in FIG. 9F, and a utility (e.g., StreamEdit) are used which are run during the make phase. A 68k code, such as the codes shown in FIG. 9A, which needs to be called from a native code is written in .a file, exactly as if it were to be linked in and called directly. The 68k codes are assembled using the existing 68k assembler, but the actual object codes generated are not used. Instead, a StreamEdit script (e.g., scripts shown in FIG. 9F) processes the textual output of the assembler, as shown in FIG. 9C, and creates a file as shown in FIG. 9D, which can be compiled by a C/C++ compiler, such as MrC PowerPC compiler. The file shown in FIG. 9D contains "C" structure definitions which contain the opcodes for the matching 68k code. This newly created .c file is then compiled by a native compiler (e.g., MrC PowerPC compiler) and linked in with the rest of the PowerPC codes. Within the native code, mixed mode calls use the addresses of these "C" structures (e.g., the "C" structure shown in FIG. 9D), as the code addresses to execute. Thus, native code is able to call 68k code without requiring significant extra work on the part of the programmer (e.g., create code resource, hand-calculate offsets of each routine, at runtime load, lock and error check each resource, and calculate each entry point, etc.).

A conventional method uses an exiting 68k assembler to assemble the 68k assembly codes. The 68k assembler generates an object file. Next code resources are generated based on the object file. Then these code resources are included in a place where they may be retrieved later at runtime. One of the disadvantages of this method is that the offsets of the routines have to be calculated by hand. The types and Ids of all such code resources need to be tracked administratively by the software developers. This posts significant burdens on a large scale project. At runtime, the application loads the code resources from the appropriate system resource file and calculates the entry points of the routines. For example, an application needs to call routine of s68kInstructionsForDisableThunk, such as one shown in FIG. 9A. The application retrieves and calculates the entry point of that by calling:

h=GetResource('ptch', –18000); //Retrieve code resource
    if (h==nil) //Error checking
        generates error;
    else
        CallUniversalProc(*h, "parameters"); //Calling the routine Another disadvantage of the conventional method is that the value (e.g., h) returned from GetResource is not always valid. One of the reasons is that there might not be enough memory to load the code resources. Thus the method has to involve error-checking, making sure the entry point is valid before calling it. The present invention introduces a unique method to automatically embed the opcodes of the 68k codes in a source code of the native system.

Figure 7:
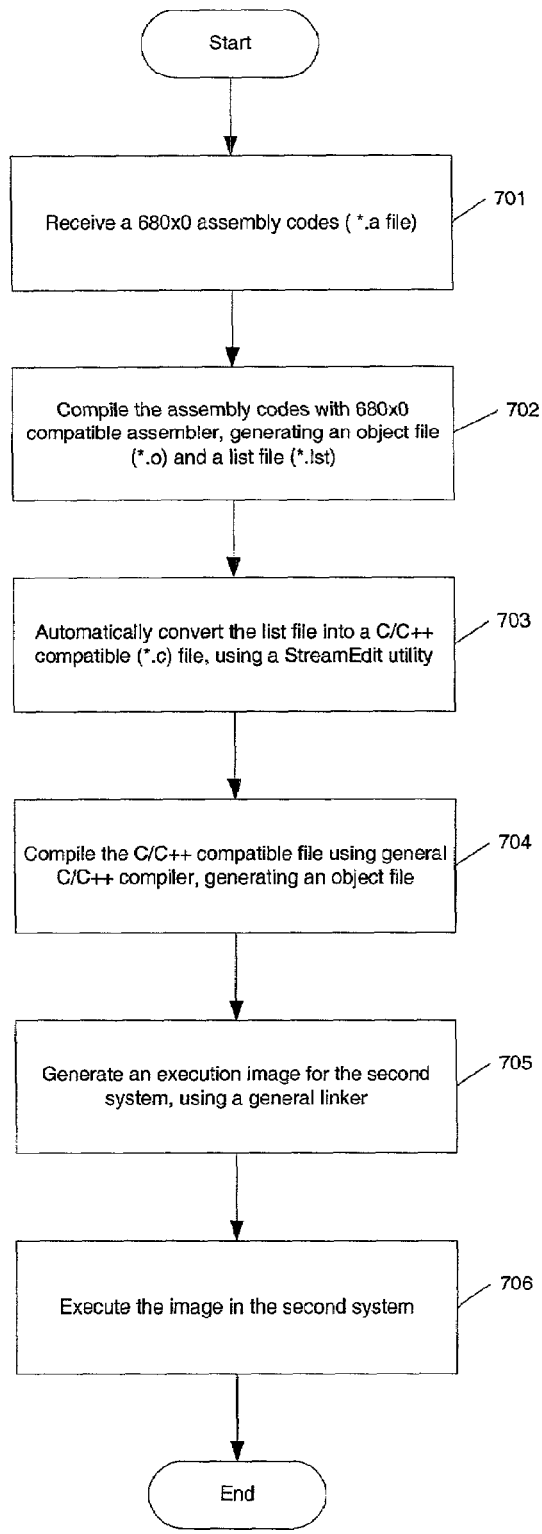
FIG. 7 shows an embodiment of a method of embedding an object code into a source code, according to an aspect of the present invention.

FIG. 7 shows a method to embed an object code into a source code, used in an embodiment of the present invention. The object code is executable in a first system having a first microprocessor. The source code is compilable to be executed in a second system having a second microprocessor. The method starts with compiling first codes having a routine, the first codes being compilable to be executed by the first microprocessor of the first system. The compilation of the first codes generates second codes, the second codes comprising object codes (e.g., opcodes) of the routine, which are executable by the first microprocessor of the first system. A utility and scripts are used to convert the second codes into third codes automatically. The third codes are compilable to be executed by the second microprocessor of the second system. Then the third codes are compiled with the rest of the native codes of the second system, using a compiler compatible with the second system, generating fourth codes. The fourth codes are executable by the second microprocessor of the second system. As a result, the routine of the first codes is embedded in the source codes compilable to be executed in the second system.

Referring to FIG. 7, the method starts with receiving 701 a 68k assembly codes. An example of the 68k assembly codes are shown in FIG. 9A. The 68k assembly codes may be specifically written to be executed by a 680×0 compatible Macintosh computer. The 68k assembly codes are then assembled 702 with an existing 68k assembler. Output of the 68k assembler includes an object file (e.g., .o file) containing object code, and a listing file (e.g., .lst file). FIG. 9C shows an example of the listing file corresponding to the assembly codes shown in FIG. 9A. The listing file contains opcodes of the assembly instructions. For instance, hex value of 0x7000 is the opcode of instruction "moveq #0, d0", as described in FIG. 9C. The opcodes of the 68k assembly instructions may not be executed directly by a PowerPC processor. They may, however, be executed through an emulator (e.g., 68LC040 emulator). Next, the listing file containing opcodes of the 68k assembly codes is processed 703 by a set of scripts and a StreamEdit utility automatically. FIG. 9F shows an example of the scripts used in one embodiment of the present invention. The StreamEdit utility converts the opcodes listed in the listing file into C/C++ compatible data structures, as shown in FIG. 9D. The data structures shown in FIG. 9D may be compiled 704 by a native C/C++ compiler (e.g., MrC PowerPC compiler), dedicated to the PowerPC processor, generating an object file containing the opcodes of the assembly codes. Then the newly created object file is linked 705 with the rest of the native codes to generate a final executable image which may be executed 706 by a PowerPC processor. As a result, the opcodes of the 68k assembly codes are embedded in the data section of the native codes executed in a PowerPC computer. Since the object codes of the 68k assembly codes are located in the data section of the executable image, they are accessible anytime as global variables from the rest of the native codes. This method provides advantages over the conventional approach. The conventional approach loads the opcodes through code resources stored in system resource files at runtime. The codes may not be loaded successfully at all times, for a variety of reasons. As a result, additional attempts and error-checking must be followed. The present invention presents this unique method of embedding 68k opcodes in native codes automatically. One of the advantages of the present invention is that the 68k routines are embedded in the static data section of the final native executable image. The routines are treated as static global variables which are always available. The calling routine does not need to invoke the system resources. Instead the native calling routine can call the 68k routine directly:

CallUniversalProc(&DisableInterrupts);

where CallUniversalProc is an API to the mixed mode manager. FIG. 9G shows an example of a main routine calling the embedded object code. The caller does not need to check if this code is available because the 68k opcode resides in the static data section of the native code. They are always available once the native executable image is loaded. The entire processes are performed automatically without involving a great burden on a programmer. In one embodiment, the entire processes are typically configured by a MAKE file, such as the MAKE file shown in FIG. 9E.

Figure 8:
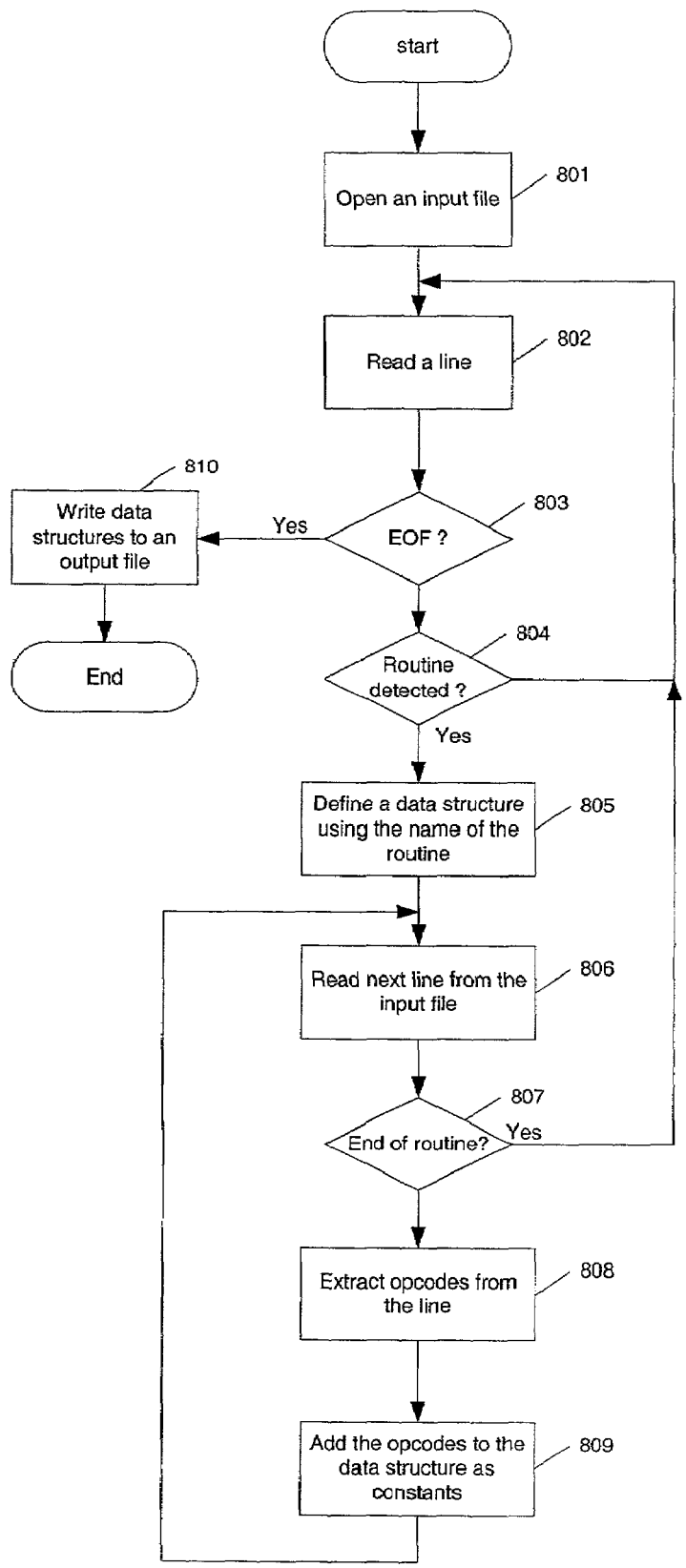
FIG. 8 shows an embodiment of a method of the invention, for converting an object file of the source system into a source code compatible with the target system.

FIG. 8 shows a method to convert a listing file into a C/C++ compatible format used in one embodiment of the present invention. The method opens an input file stored in a storage media (e.g., hard disk). It then reads a line from the input file into a memory location (e.g., random access memory (RAM)). Next the method scans the line searching for the starting of a routine. If the line does not contain the starting of a routine, a next line would be read from the input file until a starting of the routine is found. Once the routine is detected, a data structure is created using the name of the routine. Then the method scans subsequent lines searching for opcodes of the object. The method extracts the opcodes from the line read from the input file and add those opcodes into the newly created data structure. These processes continue until the end of the routine is detected. The starting and ending of the routine are detected based on specific tokens. If the end of file (EOF) is reached, the method writes the data structures to an output file and the processes end. In one embodiment, the method opens the input file and the output file concurrently. It reads opcodes from the input file, processes the opcodes, creates a data structure, and writes the data structure to the output file simultaneously. That is, the method may process a routine and write a data structure to the output file at one time. In an alternative embodiment, these processes can be implemented to handle multiple input files and output files simultaneously using multithreaded technology. It is typically useful to be applied to a large project.

Referring to FIG. 8, the method opens 801 an input, which may be the listing file generated from the compilation of the 68k assembly codes, such as the assembly codes shown in FIG. 9A. An example of the listing file is shown in FIG. 9C. A line is then read 802 from the listing file. Next the method scans 804 the line read from the input file for the starting of a routine. The start of a routine normally contains a token indicating the starting of the routine, such as "PROC" shown in FIG. 9C. If a routine is detected, a data structure is created 805, using the name of the routine detected (e.g., name of the routine s68kInstructionsForDisableThunk). The data structure is C/C++ compatible in general. Once the data structure is created, it continues to read 806 a next line from the input file. Then it scans the line and extracts 808 the opcode (e.g., hex number 0x7000 of FIG. 9C), from the line and adds 809 the opcode in the data structure. An example of the data structure is shown in FIG. 9D. If the end of the routine is detected 807 (e.g., "endproc" is detected), the data structure is completed and the method starts to process a next routine. If the end of file (EOF) is detected 803, it writes 810 all data structures created during the processes to an output file and the processes end. In another embodiment, the method opens an output file simultaneously and writes the data structure to the output file once the data structure is completed.

It is important to note that the present invention is not limited to embed 68k assembly codes in a C/C++ source code. The present invention may be used to embed one architecture's codes, such as Java bytecodes, in another architecture's codes (e.g., data section of an executable image). Although the 68k assembly codes are put into a separate file according to an embodiment of the invention, it would be appreciated that the 68k codes may be embedded inline with an original C/C++ code.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method for processing source codes, the method comprising:

compiling a first source code using a first compiler to generate an object file containing object codes and a listing file containing opcodes of instructions of the first source code, the first source code including a routine having one or more instructions only executable by a first platform and recognizable by the first compiler dedicated to the first platform;

creating a data structure containing the opcodes of the one or more instructions of the routine based on the listing file without using the object file; and generating an executable image based on a compilation of a second source code and the created data structure using a second compiler dedicated to a second platform different than the first platform, wherein the executable image, when loaded into a code area of a memory of the second platform, accesses the data structure loaded within a data area of the memory to perform a task of the routine of the first source code.

2. The method of claim 1, wherein creating a data structure comprises:

parsing the listing file to identify the opcodes of the routine based on a name of the routine of the first source code;

extracting the opcodes of the routine from the listing file; and defining one or more data members of the data structure using the opcodes of the routine extracted from the listing file.

3. The method of claim 2, wherein the data structure is defined using a name identical to the name of the routine.

4. The method of claim 2, further comprising executing a script defining one or more rules to perform the identifying and extracting the opcodes of the routine from the listing file, wherein the script is executed from a MAKE file for developing the executable image.

5. The method of claim 1, wherein the first source code is a Motorola 68x0 compatible assembly code and the first compiler is a Motorola 680x0 compatible assembler, and wherein the second source code is a C/C++ compatible code and the second compiler is a C/C++ compatible compiler.

6. The method of claim 5, further comprising invoking a PowerPC compatible linker to generate the executable image based on object files generated via the compilation of the second source code using the C/C++ compatible compiler, wherein the executable image is only executable by a PowerPC compatible platform.

7. The method of claim 1, wherein the data structure is loaded into a global static data area of the memory when the executable image is executed in the second platform, and wherein the data structure is accessible by one or more routines of the executable image loaded in the code area of the memory.

8. The method of claim 1, further comprising executing the executable image within the second platform including loading and accessing the data structure in a data area of a system memory of the second platform in order to perform the task of the routine of the first source code.

9. The method of claim 8, wherein executing the executable image comprises calling a mixed mode manager of the second platform to invoke an emulator compatible with the first platform to perform the task of the routine of the first source code by processing the data structure having the opcodes of the routine.

10. The method of claim 7, wherein the mixed mode manager is integrated as a part of an operating system of the second platform.

11. The method of claim 9, wherein calling a mixed mode manager of the second platform comprises passing a pointer of the data structure to the mixed mode manager via an application programming interface (API), the pointer linking with an address of the data area of the memory where the data structure is loaded.

12. A machine-readable medium having machine executable code to cause a machine to perform a method for processing source codes, the method comprising:

compiling a first source code using a first compiler to generate an object file containing object codes and a listing file containing opcodes of instructions of the first source code, the first source code including a routine having one or more instructions only executable by a first platform and recognizable by the first compiler dedicated to the first platform;

creating a data structure containing the opcodes of the one or more instructions of the routine based on the listing file without using the object file; and generating an executable image based on a compilation of a second source code and the created data structure using a second compiler dedicated to a second platform different than the first platform, wherein the executable image, when loaded into a code area of a memory of the second platform, accesses the data structure loaded within a data area of the memory to perform a task of the routine of the first source code.

13. The machine-readable medium of claim 12, wherein creating a data structure comprises:
parsing the listing file to identify the opcodes of the routine based on a name of the routine of the first source code;
extracting the opcodes of the routine from the listing file; and
defining one or more data members of the data structure using the opcodes of the routine extracted from the listing file.

14. The machine-readable medium of claim 13, wherein the data structure is defined using a name identical to the name of the routine.

15. The machine-readable medium of claim 14, wherein the method further comprises executing a script defining one or more rules to perform the identifying and extracting the opcodes of the routine from the listing file, wherein the script is executed from a MAKE file for developing the executable image.

16. The machine-readable medium of claim 12, wherein the first source code is a Motorola 680x0 compatible assembly code and the first compiler is a Motorola 680x0 compatible assembler, and wherein the second source code is a C/C++ compatible code and the second compiler is a C/C++ compatible compiler.

17. The machine-readable medium of claim 16, wherein the method further comprises invoking a PowerPC compatible linker to generate the executable image based on object files generated via the compilation of the second source code using the C/C++ compatible compiler, wherein the executable image is only executable by a PowerPC compatible platform.

18. The machine-readable medium of claim 12, wherein the data structure is loaded into a global static data area of the memory when the executable image is executed in the second platform, and wherein the data structure is accessible by one or more routines of the executable image loaded in the code area of the memory.

19. The machine-readable medium of claim 12, wherein the method further comprises executing the executable image within the second platform including loading and accessing the data structure in a data area of a system memory of the second platform in order to perform the task of the routine of the first source code.

20. The machine-readable medium of claim 19, wherein executing the executable image comprises calling a mixed mode manager of the second platform to invoke an emulator compatible with the first platform to perform the task of the routine of the first source code by processing the data structure having the opcodes of the routine.

21. The machine-readable medium of claim 11, wherein the mixed mode manager is integrated as a part of an operating system of the second platform.

22. The machine-readable medium of claim 11, wherein calling a mixed mode manager of the second platform comprises passing a pointer of the data structure to the mixed mode manager via an application programming interface (API), the pointer linking with an address of the data area of the memory where the data structure is loaded.

23. An apparatus for processing source codes, the apparatus comprising:
means for compiling a first source code using a first compiler to generate an object file containing object codes and a listing file containing opcodes of instructions of the first source code, the first source code including a routine having one or more instructions only executable by a first platform and recognizable by the first compiler dedicated to the first platform;
means for creating a data structure containing the opcodes of the one or more instructions of the routine based on the listing file without using the object file; and
means for generating an executable image based on a compilation of a second source code and the created data structure using a second compiler dedicated to a second platform different than the first platform, wherein the executable image, when loaded into a code area of a memory of the second platform, accesses the data structure loaded within a data area of the memory to perform a task of the routine of the first source code.

24. The apparatus of claim 23, wherein means for creating a data structure comprises:
means for parsing the listing file to identify the opcodes of the routine based on a name of the routine of the first source code;
means for extracting the opcodes of the routine from the listing file; and
means for defining one or more data members of the data structure using the opcodes of the routine extracted from the listing file.

25. The apparatus of claim 24, wherein the data structure is defined using a name identical to the name of the routine.

26. The apparatus of claim 24, further comprising means for executing a script defining one or more rules to perform the identifying and extracting the opcodes of the routine from the listing file, wherein the script is executed from a MAKE file for developing the executable image.

27. The apparatus of claim 23, wherein the first source code is a Motorola 680x0 compatible assembly code and the first compiler is a Motorola 680x0 compatible assembler, and wherein the second source code is a C/C++ compatible code and the second compiler is a C/C++ compatible compiler.

28. The apparatus of claim 27, further comprising means for invoking a PowerPC compatible linker to generate the executable image based on object files generated via the compilation of the second source code using the C/C++ compatible compiler, wherein the executable image is only executable by a PowerPC compatible platform.

29. The apparatus of claim 23, wherein the data structure is loaded into a global static data area of the memory when the executable image is executed in the second platform, and wherein the data structure is accessible by one or more routines of the executable image loaded in the code area of the memory.

30. The apparatus of claim 23, further comprising means for executing the executable image within the second platform including loading and accessing the data structure in a data area of a system memory of the second platform in order to perform the task of the routine of the first source code.

31. The apparatus of claim 30, wherein means for executing the executable image comprises means for calling a mixed mode manager of the second platform to invoke an emulator compatible with the first platform to perform the task of the routine of the first source code by processing the data structure having the opcodes of the routine.

32. The apparatus of claim 31, wherein the mixed mode manager is integrated as a part of an operating system of the second platform.

33. The apparatus of claim 31, wherein means for calling a mixed mode manager of the second platform comprises means for passing a pointer of the data structure to the mixed mode manager via an application programming interface (API), the pointer linking with an address of the data area of the memory where the data structure is loaded.

34. A system for processing source codes, comprising:
a first compiler to compile a first source code to generate an object file containing object codes and a listing file containing opcodes of instructions of the first source code, the first source code including a routine having one or more instructions only executable by a first platform and recognizable by the first compiler dedicated to the first platform;
a utility application to create a data structure containing the opcodes of the one or more instructions of the routine based on the listing file without using the object file; and
a second compiler to generate an executable image based on a compilation of a second source code and the created data structure, the second compiler being dedicated to a second platform different than the first platform, wherein the executable image, when loaded into a code area of a memory of the second platform, accesses the data structure loaded within a data area of the memory to perform a task of the routine of the first source code.

35. A data processing system, comprising:
a processor; and
a memory for storing instructions, when executed from the memory, causes the processor to
compile a first source code using a first compiler to generate an object file containing object codes and a listing file containing opcodes of instructions of the first source code, the first source code including a routine having one or more instructions only executable by a first platform and recognizable by the first compiler dedicated to the first platform,
create a data structure containing the opcodes of the one or more instructions of the routine based on the listing file without using the object file, and
generate an executable image based on a compilation of a second source code and the created data structure using a second compiler dedicated to a second platform different than the first platform, wherein the executable image, when loaded into a code area of a memory of the second platform, accesses the data structure loaded within a data area of the memory to perform a task of the routine of the first source code.

* * * * *